No. 759,134. PATENTED MAY 3, 1904.
J. H. SCHOLDING.
TIRE FOR VEHICLES.
APPLICATION FILED NOV. 29, 1901.
NO MODEL.

Witnesses:
Samuel W. Balch
Geo. L. Wheelock

Inventor,
John H. Scholding
By Thomas Ewing, Jr.,
Attorney

No. 759,134. Patented May 3, 1904.

UNITED STATES PATENT OFFICE.

JOHN H. SCHOLDING, OF YONKERS, NEW YORK.

TIRE FOR VEHICLES.

SPECIFICATION forming part of Letters Patent No. 759,134, dated May 3, 1904.

Application filed November 29, 1901. Serial No. 84,056. (No model.)

*To all whom it may concern:*

Be it known that I, JOHN H. SCHOLDING, a citizen of the United States of America, and a resident of Yonkers, in the county of Westchester and State of New York, have invented certain new and useful Improvements in Tires for Vehicles, of which the following is a specification.

This invention relates to tires for vehicles in which the passage of the wheels over streetcar rails at an oblique angle and over other obstructions which project above the general level of the roadway is facilitated by placing notches along both corners formed by the sides and tread of the tire on each wheel. Each notch opens out into the tread and one side.

One object of the invention is to so form the notches that without interfering with the function above noted they will not make the tread narrower than the body of the tire, except just at the notches, and at the same time have the notches inclined. The purpose of the inclination is to enable the wheel in rolling along the ground to lift free from mud which may press into the notches, and thereby reduce the liability of the notches becoming clogged or the throwing of mud by the notches.

Another object of the invention is to make the walls of each notch part of a semicylindrical surface, which can be cut in the tire-rim by a suitably-guided drill, so that the operation of cutting the notches can be performed on the tires without removing the wheels from the vehicle, and the vehicle can be kept in a condition for immediate use while the tires are being notched. This is desirable, as an important application of the invention is to the wheels of fire-engines and to hose-carriages, which must be kept in a condition for immediate use while the tires are being notched.

Figure 1:
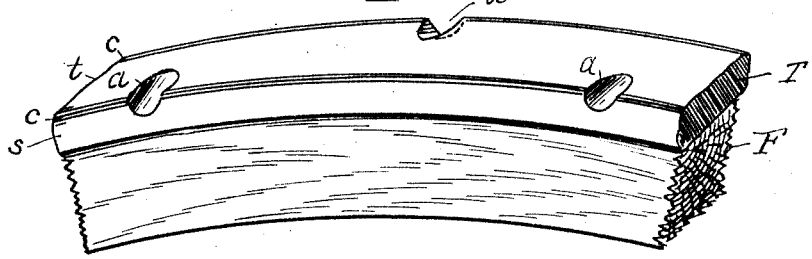
Figure 2:
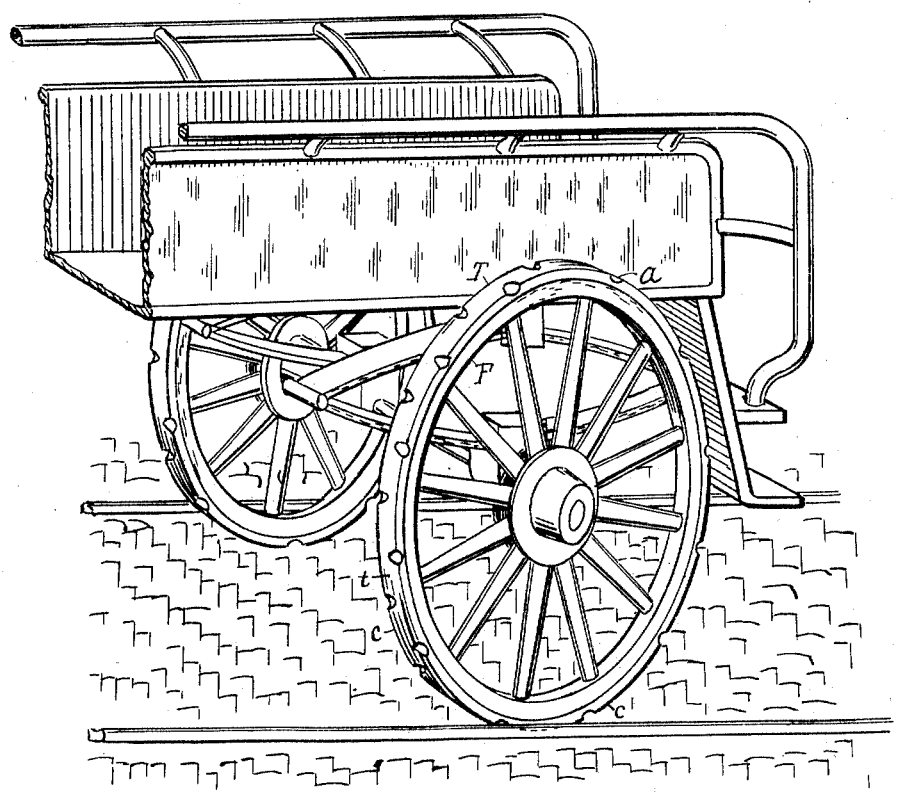

In the accompanying sheet of drawings, which forms a part of this specification, Figure 1 is a perspective view of a portion of a wheel-rim, showing the felly, the tire, and three notches in the corners of the tire. Fig. 2 is a perspective view of the rear portion of a hose-carriage, showing the invention applied to the tires of the rear wheels.

The tires T of the wheels are carried by the fellies F in the usual way. The exposed parts of each of the tires are a tread $t$, the sides $s$, and the corners $c$, formed by the meeting of the tread with each side. Each notch $a$ intersects one of the corners and opens out into the tread and the adjoining side. For wheels of a fire-vehicle I make each notch about an inch in width and space the notches perfectly at intervals of about three inches along each corner. The notches are preferably alternated on the two corners instead of being placed directly opposite to each other. The tire therefore does not have its cross-section reduced at any point by more than the amount removed in forming one notch. The walls of each notch form part of a semicylindrical surface, the axis of the cylinder being inclined to the tread of the tire at the point of intersection at about thirty degrees. All parts of the walls are therefore also inclined to the tread, and since they are within a semicylinder they are at all points oblique to the tread of the tire, so that they will freely lift away from any mud which is pressed into the notch as the wheel rolls along the ground.

What I claim, and desire to secure by Letters Patent of the United States, is—

A wheel-tire having a tread the width of the body of the tire, and formed with inclined straight semicylindrical notches at the corners formed by the sides and the tread of the tire, the ends of each notch opening out at the tread and the adjoining side of the tire, substantially as described.

Signed by me at Yonkers, New York, this 21st day of November, 1901.

JOHN H. SCHOLDING.

Witnesses:
 FREDERICK W. SCHOLDING,
 A. VAN HOUTEN.